(12) United States Patent
Shimasaki

(10) Patent No.: US 11,292,524 B2
(45) Date of Patent: Apr. 5, 2022

(54) VEHICLE LOWER PORTION STRUCTURE

(71) Applicant: TOYOTA JIDOSHA KABUSHIKI KAISHA, Aichi-ken (JP)

(72) Inventor: Osamu Shimasaki, Nisshin (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 1 day.

(21) Appl. No.: 16/810,842

(22) Filed: Mar. 6, 2020

(65) Prior Publication Data

US 2020/0298915 A1 Sep. 24, 2020

(30) Foreign Application Priority Data

Mar. 18, 2019 (JP) .............................. JP2019-049999

(51) Int. Cl.
*B62D 25/02* (2006.01)
*B62D 25/20* (2006.01)
*B60R 22/24* (2006.01)
*B62D 27/02* (2006.01)

(52) U.S. Cl.
CPC ............ *B62D 25/025* (2013.01); *B60R 22/24* (2013.01); *B62D 25/2036* (2013.01); *B62D 27/02* (2013.01); *B62D 27/023* (2013.01)

(58) Field of Classification Search
CPC ..................................... B62D 25/025
USPC ........................................... 296/209
See application file for complete search history.

(56) References Cited

U.S. PATENT DOCUMENTS

| | | | |
|---|---|---|---|
| 2012/0161475 A1 | 6/2012 | Mori | |
| 2013/0076075 A1* | 3/2013 | Pohl | B62D 25/02 296/193.05 |
| 2017/0144711 A1* | 5/2017 | Daigaku | B62D 25/025 |
| 2018/0162449 A1* | 6/2018 | Ghislieri | B62D 65/02 |
| 2020/0377045 A1* | 12/2020 | Renegar | B62D 25/025 |

FOREIGN PATENT DOCUMENTS

| | | | |
|---|---|---|---|
| JP | 2012148590 A | * | 8/2012 |
| JP | 5206881 B2 | | 6/2013 |
| JP | 2016-52866 A | | 4/2016 |
| JP | 2016-199055 A | | 12/2016 |

* cited by examiner

*Primary Examiner* — Dennis H Pedder
(74) *Attorney, Agent, or Firm* — Hauptman Ham, LLP

(57) ABSTRACT

Provided is a vehicle lower portion structure including: a thin plate portion that configures a portion of a substantially plate-like rocker component member on the vehicle rear side of a center pillar, the rocker component member configuring at least part of a rocker extending in the vehicle front and rear direction; and a thick plate portion that configures a portion of the rocker component member on the vehicle front side of the center pillar and whose plate thickness is set thicker than that of the thin plate portion.

13 Claims, 3 Drawing Sheets

VEHICLE LOWER PORTION STRUCTURE

CROSS-REFERENCE TO RELATED APPLICATION

This application claims priority under 35 USC 119 from Japanese Patent Application No. 2019-049999 filed on Mar. 18, 2019, the disclosure of which is incorporated by reference herein in its entirety.

BACKGROUND

Technical Field

The present disclosure relates to a vehicle lower portion structure.

Related Art

Japanese Patent Application Laid-open (JP-A) No. 2016-052866 discloses a vehicle lower portion structure. The vehicle lower portion structure has rockers, which are provided on both vehicle width direction end portions of a floor of the vehicle and extend in the vehicle front and rear direction, and rocker reinforcements, which are attached to the rockers. The rocker reinforcements are attached to the vehicle front sides of the rockers, specifically, the vehicle front sides of portions where a cross member positioned on the vehicle front side of a center pillar is bonded to the rockers. Because of this, deformation of the rockers can be inhibited at the time of a small overlap impact in which the impact load concentrates between the leading ends of the rockers and the cross member.

However, in the configuration disclosed in JP-A No. 2016-052866, the rocker reinforcements that are separate members are attached to the rockers, so if the attachment structures and the like are also included, the degree of the increase in weight becomes greater. Consequently, JP-A No. 2016-052866 has room for improvement in this respect.

SUMMARY

In consideration of the above circumstances, the present disclosure obtains a vehicle lower portion structure that can improve vehicle rigidity while inhibiting an increase in weight.

A first aspect of the disclosure is a vehicle lower portion structure including: a thin plate portion that configures a portion of a substantially plate-like rocker component member at a vehicle rear side of a center pillar, the rocker component member configuring at least part of a rocker extending in a vehicle front-rear direction; and a thick plate portion that configures a portion of the rocker component member at a vehicle front side of the center pillar and that has a larger plate thickness than the thin plate portion.

According to the first aspect, the plate-like rocker component member configuring at least part of the rocker has the thin plate portion and the thick plate portion. The thin plate portion configures the portion of the rocker component member on the vehicle rear side of a position corresponding to the center pillar. The thick plate portion configures the portion of the rocker component member at a vehicle front side of the center pillar. The thick plate portion has a larger plate thickness than the thin plate portion. Consequently, the thick plate portion has a higher flexural rigidity than the thin plate portion, so at the time of a frontal impact to the vehicle (hereinafter simply called "an impact to the vehicle"), deformation of the portion on the vehicle front side of the rocker where the impact load concentrates can be inhibited without adding a reinforcement member.

A second aspect of the disclosure is the vehicle lower portion structure of the first aspect, wherein the thin plate portion and the thick plate portion are joined to each other at a vehicle lower side of the center pillar.

According to the second aspect, the thin plate portion and thick plate portion are joined to each other at a vehicle lower side of the center pillar, so in a case where the impact load acts on the joint portion that has a relatively low flexural rigidity in comparison to other portions, the impact load can be dispersed to the center pillar. Consequently, deformation from the joint portion between the thin plate portion and the thick plate portion can be inhibited.

A third aspect of the disclosure is the vehicle lower portion structure of the first or second aspect, wherein an end portion at the vehicle front side of the thin plate portion and an end portion at the vehicle rear side of the thick plate portion are joined to each other by butt welding.

According to the third aspect, the mutually adjacent end portions of the thin plate portion and the thick plate portion are joined to each other by butt welding, so the thickness of the joint portion can be reduced in comparison to lap welding. Because of this, the joining together of the rocker and other members that become attached to the rocker becomes easy.

A fourth aspect of the disclosure is the vehicle lower portion structure of any one of the first aspect to the third aspect, wherein a retractor bracket, which holds a seat belt retractor housed inside the center pillar to a vehicle body, abuts a joint portion between the thin plate portion and the thick plate portion.

According to the fourth aspect, when stress acts on the joint portion that has a relatively low flexural rigidity in comparison to other portions, the stress is dispersed to the retractor bracket that abuts against the joint portion. The retractor bracket secures, to the vehicle body, the seat belt retractor housed inside the center pillar, so stress that acts on the joint portion can be dispersed, and deformation from the joint portion between the thin plate portion and the thick plate portion can be inhibited, without adding a new member.

A fifth aspect of the disclosure is the vehicle lower portion structure of the fourth aspect, wherein a vehicle upper side of the seat belt retractor is fastened to the center pillar.

As described above, the vehicle lower portion structure pertaining to the first aspect can improve vehicle rigidity while inhibiting an increase in weight.

The vehicle lower portion structure pertaining to the second aspect can further improve vehicle rigidity.

In the vehicle lower portion structure pertaining to the third aspect, manufacture becomes easy.

The vehicle lower portion structure pertaining to the fourth and fifth aspects can improve vehicle rigidity while inhibiting an increase in cost.

BRIEF DESCRIPTION OF THE DRAWINGS

An exemplary embodiment of the disclosure will be described in detail based on the following figures, wherein.

DETAILED DESCRIPTION

Figure 1:
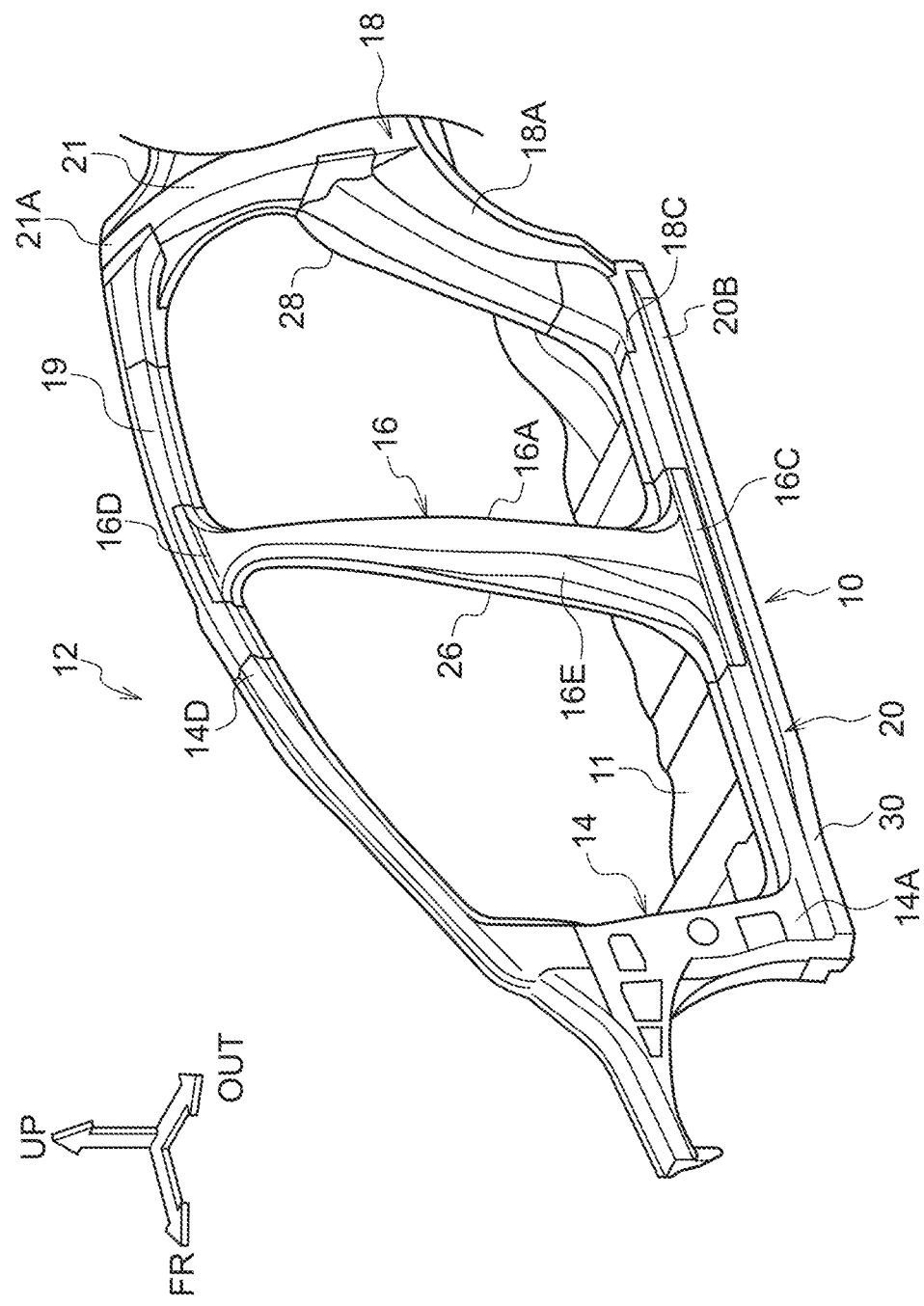
FIG. 1 is a general perspective view showing a rocker having a vehicle lower portion structure pertaining to the embodiment as seen looking inward in the vehicle width direction from outside in the vehicle width direction.

An embodiment of a vehicle lower portion structure 10 pertaining to the disclosure will be described below using FIG. 1 to FIG. 3. Arrow FR shown in these drawings indicates a forward direction in the vehicle front and rear direction, arrow OUT indicates an outward direction in the vehicle width direction, and arrow UP indicates an upward direction in the vehicle up and down direction. In the drawings, constituent elements and portions that are identical or equivalent to each other are assigned identical reference signs. Furthermore, dimensional proportions in the drawings are exaggerated for convenience of description and sometimes differ from actual proportions.

(Overall Configuration)

As shown in FIG. 1, a vehicle 12 equipped with the vehicle lower portion structure 10 has, on the vehicle width direction outer side of a vehicle floor 11, a front pillar 14, a center pillar 16, a rear wheel well 18, and a rocker 20. The front pillar 14 is provided as a right and left pair on the front side of a cabin of the vehicle 12 and is provided erect in the vehicle upward direction. The front pillar 14 is configured to include a front pillar outer lower member 14A and a front pillar inner lower member 14B (see FIG. 2), and a lower end portion 14C of the front pillar 14 is joined to a front end portion 20A of the rocker 20 (see FIG. 2).

The center pillar 16 is provided as a right and left pair in the vehicle front and rear direction substantial center of the cabin of the vehicle 12 and is provided erect in the vehicle upward direction. The center pillar 16 is configured to include a center pillar outer panel 16A and a center pillar inner panel 16B (see FIG. 2), and a lower end portion 16C of the center pillar 16 is joined to the longitudinal direction substantially center portion of the rocker 20. An upper end portion 16D of the center pillar 16 and an upper end portion 14D of the front pillar 14 are connected to each other by a roof side rail 19. Because of this, a front door opening 26 is formed by the center pillar 16, the front pillar 14, the rocker 20, and the roof side rail 19.

The rear wheel well 18 is provided as a right and left pair on the vehicle front and rear direction rear side of the cabin of the vehicle 12 and is provided erect in the vehicle upward direction. The rear wheel well 18 is configured to include a rear wheel well outer panel 18A and a rear wheel well inner panel 18B (see FIG. 2), and a front end portion 18C of the rear wheel well 18 is joined to a rear end portion 20B of the rocker 20. A rear pillar 21 is provided on the vehicle upper side of the rear wheel well 18, and an upper end 21A of the rear pillar 21 and the upper end portion 16D of the center pillar 16 are connected to each other by the roof side rail 19. Because of this, a rear door opening 28 is formed by the center pillar 16, the rocker 20, the rear wheel well 18, the rear pillar 21, and the roof side rail 19.

(Rocker)

The rocker 20 is provided as a right and left pair on side portions of the cabin of the vehicle 12 and extends along the vehicle front and rear direction. The rocker 20 has a rocker outer panel 30, which serves as a rocker component member and is provided on the vehicle width direction outer side, and a rocker inner panel, which is not shown in the drawings and is provided on the vehicle width direction inner side. As shown in FIG. 2, the rocker outer panel 30 is formed substantially in the shape of a hat, in which the shape of its cross section orthogonal to its longitudinal direction (the vehicle front and rear direction) projects outward in the vehicle width direction, by a vehicle width direction outer wall portion 30A, an upper flange 30B, a lower flange 30C, an upper extending wall portion 30D, and a lower extending wall portion 30E. Namely, the vehicle width direction outer wall portion 30A is formed in the shape of a rectangular plate whose plate thickness direction coincides substantially with the vehicle width direction and whose longitudinal direction coincides with the vehicle front and rear direction. The upper extending wall portion 30D, whose plate thickness direction coincides substantially with the vehicle up and down direction and which extends inward substantially in the vehicle width direction, is provided on the vehicle upper end portion of the vehicle width direction outer wall portion 30A. The upper flange 30B, whose plate thickness direction coincides substantially with the vehicle width direction and which extends in the vehicle upward direction, is provided on the vehicle width direction inner end portion of the upper extending wall portion 30D. The lower extending wall portion 30E, whose plate thickness direction coincides substantially with the vehicle up and down direction and which extends inward substantially in the vehicle width direction, is provided on the vehicle lower end portion of the vehicle width direction outer wall portion 30A. The lower flange 30C, whose plate thickness direction coincides substantially with the vehicle width direction and which extends in the vehicle downward direction, is provided on the vehicle width direction inner end portion of the lower extending wall portion 30E.

The rocker outer panel 30 is provided with a thin plate portion 36 and a thick plate portion 38. The thin plate portion 36 configures the portion of the rocker outer panel 30 on the vehicle rear side of the center pillar 16 and is configured by an ultra-high tensile strength steel plate.

The thick plate portion 38 configures the portion of the rocker outer panel 30 on the vehicle front side of the center pillar 16 and is configured by an ultra-high tensile strength steel plate like the thin plate portion 36. The plate thickness of the thick plate portion 38 is set thicker than that of the thin plate portion 36.

The rocker outer panel 30 is formed by joining the thin plate portion 36 and the thick plate portion 38 to each other at a joint portion 40 using what is called the tailored blank (tailored weld blank) process. Namely, an end portion 36A on the vehicle front side of the thin plate portion 36 that is in the form of a flat plate prior to molding and an end portion 38A on the vehicle rear side of the thick plate portion 38 that is in the form of a flat plate prior to molding are butt-welded to each other to integrate them, and thereafter the rocker outer panel 30 is stamped substantially into the shape of a hat in which the shape of its cross section orthogonal to the vehicle front and rear direction projects outward in the vehicle width direction (see FIG. 3). In other words, the vehicle width direction outer wall portion 30A, the upper flange 30B, the lower 30C, the upper extending wall portion 30D, and the lower extending wall portion 30E of the rocker outer panel 30 are continuously formed in the thin plate portion 36 and the thick plate portion 38. The joint portion 40 is disposed in a position corresponding to the lower end portion 16C of the center pillar 16 as seen in a vehicle side view.

(Seat Belt Retractor)

A seat belt retractor 44 is provided in the lower end portion of the center pillar 16. The seat belt retractor 44 is provided inside a space between a pair of side wall portions 16E (see also FIG. 1) in the vehicle front and rear direction of the center pillar 16. Furthermore, the seat belt retractor 44 is configured to be capable of housing one end side of a seat belt not shown in the drawings and is secured to the vehicle body via a retractor bracket 48.

The retractor bracket 48 is joined so as to straddle, in the vehicle front and rear direction, the joint portion 40 of the rocker outer panel 30, and the seat belt retractor 44 is bonded to part of the retractor bracket 48. That is, the seat belt retractor 44 is held on the rocker 20 via the retractor bracket 48. The vehicle upper side of the retractor 44 is fastened to the center pillar inner panel 16B.

The rocker inner panel is formed in the shape of a hat in which the shape of its cross section orthogonal to its longitudinal direction projects inward in the vehicle width direction (not shown in the drawings). The rocker outer panel 30 and the rocker inner panel are joined to each other, whereby the rocker 20 forms a closed cross-sectional structure.

(Operation and Advantageous Effects)

Explanation follows regarding operation and advantageous effects of the present exemplary embodiment.

Figure 3:
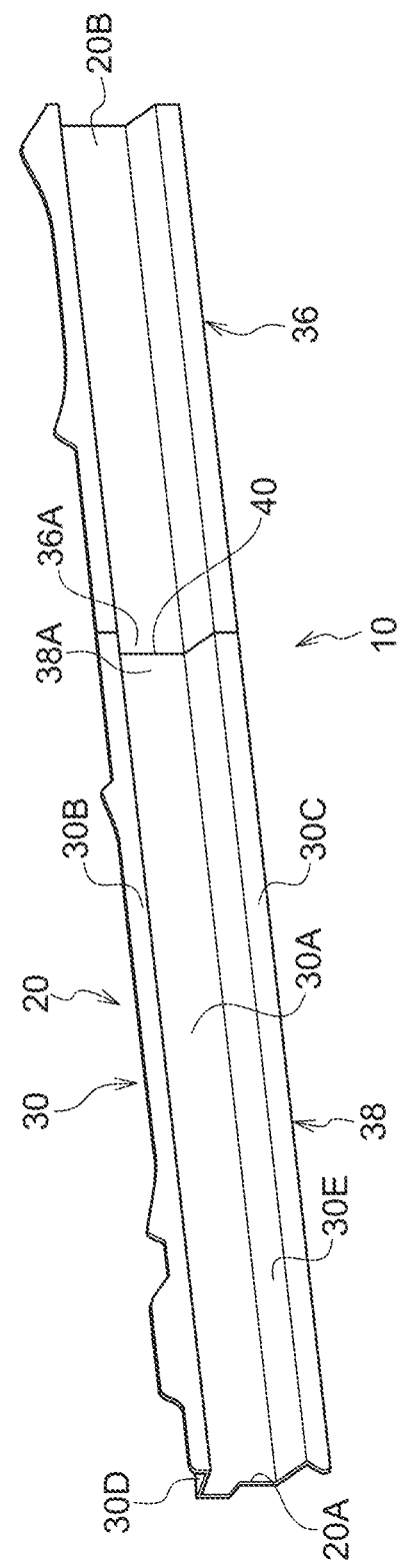
FIG. 3 is a general perspective view showing just the rocker of FIG. 2.

In the embodiment, as shown in FIG. 3, the plate-like rocker outer panel 30 configuring at least part of the rocker has the thin plate portion 36 and the thick plate portion 38. The thin plate portion 36 configures the portion of the rocker outer panel 30 on the vehicle rear side of a position corresponding to the center pillar 16. The thick plate portion 38 configures the portion of the rocker outer panel 30 at a vehicle front side of the center pillar 16. The thick plate portion 38 has a larger plate thickness than the thin plate portion 36. Consequently, the thick plate portion 38 has a higher flexural rigidity than the thin plate portion 36, so at the time of an impact to the vehicle, deformation of the portion on the vehicle front side of the rocker 20 where the impact load concentrates can be inhibited without adding a reinforcement member. Because of this, vehicle rigidity can be improved while inhibiting an increase in weight.

Furthermore, the thin plate portion 36 and the thick plate portion 38 are joined to each other at a vehicle lower side of the center pillar 16, so in a case where the impact load acts on the joint portion 40 that has a relatively low flexural rigidity in comparison to other portions, the impact load can be dispersed to the center pillar 16. Consequently, deformation from the joint portion 40 between the thin plate portion 36 and the thick plate portion 38 can be inhibited. Because of this, vehicle rigidity can be further improved.

Moreover, the mutually adjacent end portions 36A, 38A of the thin plate portion 36 and the thick plate portion 38 are joined to each other by butt welding, so the thickness of the joint portion 40 can be reduced in comparison to lap welding. Consequently, the joining together of the rocker 20 and other members that become attached to the rocker 20 becomes easy. Because of this, manufacture becomes easy.

Moreover, because the mutually adjacent end portions 36A, 38A of the thin plate portion 36 and the thick plate portion 38 are joined to each other by butt welding, there is greater flexibility for the plate thickness of the thin plate portion 36 and the thick plate portion 38 in comparison to a case where the end portions 36A, 38A are laid on top of and welded to each other. Consequently, design flexibility can be improved.

Figure 2:
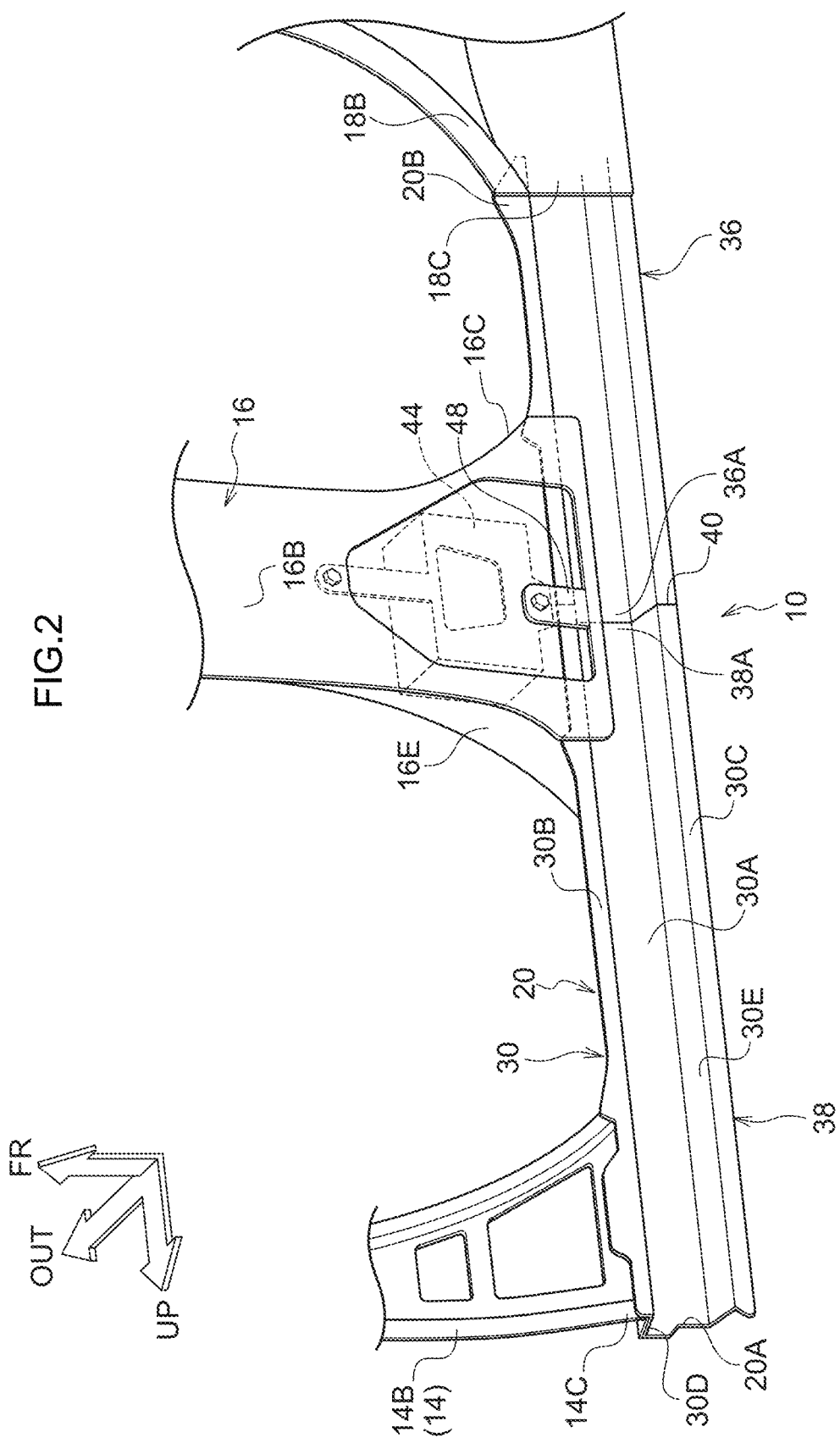
FIG. 2 is a general perspective view showing the rocker having the vehicle lower portion structure pertaining to the embodiment as seen looking outward in the vehicle width direction from inside in the vehicle width direction.

Furthermore, when stress acts on the joint portion 40 that has a relatively low flexural rigidity in comparison to other portions, as shown in FIG. 2, the stress is dispersed to the retractor bracket 48 that abuts against the joint portion 40. The retractor belt 48 secures, to the vehicle body, the seat belt retractor 44 housed inside the center pillar 16, so stress that acts on the joint portion 40 can be dispersed, and deformation from the joint portion 40 between the thin plate portion 36 and the thick plate portion 38 can be inhibited, without adding a new member. Because of this, vehicle rigidity can be improved while utilizing existing members.

In the above embodiment, the vehicle lower portion structure 10 has a configuration where the thin plate portion 36 and the thick plate portion 38 are provided in the rocker outer panel 30, but the vehicle lower portion structure 10 is not limited to this and may also have a configuration where the thin plate portion 36 and the thick plate portion 38 are provided in the rocker inner panel.

An embodiment of the disclosure has been described above, but the disclosure is not limited to what is described above and can of course be modified and implemented in various ways, in addition to what is described above, in a range that does not depart from the spirit thereof.

What is claimed is:

1. A vehicle lower portion structure, comprising:
a thin plate portion that configures a portion of a substantially plate-like rocker component member at a vehicle rear side of a center pillar, the rocker component member configuring at least part of a rocker extending in a vehicle front-rear direction; and
a thick plate portion that configures a portion of the rocker component member at a vehicle front side of the center pillar and that has a larger plate thickness than the thin plate portion, wherein the thick plate portion is joined, in direct physical contact, to the thin plate portion at a joint portion, and the joint portion is directly below the center pillar.

2. The vehicle lower portion structure according to claim 1, wherein no part of the thin plate portion is on a vehicle forward side of the of the center pillar.

3. The vehicle lower portion structure according to claim 1, wherein an end portion at the vehicle front side of the thin plate portion and an end portion at the vehicle rear side of the thick plate portion are joined to each other by butt welding.

4. The vehicle lower portion structure according to claim 1, wherein a retractor bracket, which holds a seat belt retractor housed inside the center pillar to a vehicle body, abuts a joint portion between the thin plate portion and the thick plate portion.

5. The vehicle lower portion structure according to claim 4, wherein a vehicle upper side of the seat belt retractor is fastened to the center pillar.

6. A vehicle lower portion structure, comprising:
a thin plate portion that configures a portion of a substantially plate-like rocker component member at a vehicle rear side of a center pillar, the rocker component member configuring at least part of a rocker extending in a vehicle front-rear direction; and
a thick plate portion that configures a portion of the rocker component member at a vehicle front side of the center pillar and that has a larger plate thickness than the thin plate portion, wherein a retractor bracket, which holds a seat belt retractor housed inside the center pillar to a vehicle body, abuts a joint portion between the thin plate portion and the thick plate portion.

7. The vehicle lower portion structure according to claim 6, wherein the joint portion is at a vehicle lower side of the center pillar.

8. The vehicle lower portion structure according to claim 6, wherein an end portion at the vehicle front side of the thin plate portion and an end portion at the vehicle rear side of the thick plate portion are joined to each other by butt welding.

9. The vehicle lower portion structure according to claim 6, wherein a vehicle upper side of the seat belt retractor is fastened to the center pillar.

10. A vehicle lower portion structure, comprising:
  a center pillar;
  a rocker component extending in a vehicle front-rear direction, wherein the rocker component comprises:
    a thin plate portion at a vehicle rear side of the center pillar; and
    a thick plate portion at a vehicle front side of the center pillar, wherein a thickness of the thick plate portion is greater than a thickness of the thin plate portion; and
  a retractor bracket for holding a seat belt retractor, wherein the retractor bracket is inside the center pillar, and the retractor bracket straddles, in the vehicle front and read direction, a joint portion between the thin plate portion and the thick plate portion.

11. The vehicle lower portion structure according to claim 10, wherein the joint portion is at a vehicle lower side of the center pillar.

12. The vehicle lower portion structure according to claim 10, wherein an end portion at the vehicle front side of the thin plate portion and an end portion at the vehicle rear side of the thick plate portion are joined to each other by butt welding.

13. The vehicle lower portion structure according to claim 10, wherein a vehicle upper side of the seat belt retractor is fastened to the center pillar.

* * * * *